(12) United States Patent
Lochier

(10) Patent No.: X9510
(45) Date of Patent: Mar. 18, 1836

(54) TANNING

(76) Inventor: Henry C. Lochier

Henry C. Locker, (Administrator of Henry Locker deceased) of the
City of Baltimore State of Maryland.

[Dated March 18 1836] Letters Patent.

The schedule referred to in these Letters Patent and making part of the same
containing a description in the words of the said Henry C. Locker himself
administrator of Henry Locker deceased of said Henry Lockers improvement
in the art of Tanning.

To all to whom these presents shall come —
Be it known that Henry Locker late of the city of Baltimore now deceased
in his life time, had invented a new and useful improvement in the art of
Tanning, called a communicable Latch System in the art of Tanning, and that
the following is a full and exact description thereof, a general communication
with every vat intended to be used, is made by means of trunks or tubes placed
on the outside and about six inches from the top of the vat, and made tight
so that water may be sent with equal ease in any direction through them, a
perpendicular trunk or tube is placed in one corner of each vat. extending from the top
to within about four inches of the bottom, small tubes are branched off from the
main or horizontal trunk or tube and inserted into each of the perpendicular trunks
or tubes and also into the opposite ends of the vats called handlers and into the [illegible]
[illegible]. other small tubes are made to connect the several perpendicular trunks or
tubes with the adjoining vats, of those generally termed latches, so that the liquor or
juice of the bark may be transferred or driven from one vat to another, in any di-
rection. The perpendicular trunks or tubes may, to save room in the vats, be placed
on the outside with communication at the bottom. This plan enables the Tanner
to multiply the liquors or juices in the vats termed latches to any degree of strength
and at the same time to exchange strong for weak without [illegible] [illegible]
[illegible] and without labor more than drawing the plugs out of the tubes necessary
to be opened, and turning the water from the Hydrant or pump, on one or more
of the latches, thus as many as you please will exchange and the latches [illegible]
[illegible] [illegible] in strength. This is done on the philosophical principle of
lighter bodies rising to the top, as for example: to drive the strong liquor out of the vat; cause a light and steady stream of water to fall on the back in the vat
or on a board laid on top of the liquor, and as soon as the liquor rises to the [illegible]
in the perpendicular trunk, it escapes by that tube and is let into any other vat that
is opened to receive it and its place is supplied by the water, If the reverse is wanted, let
the liquor into the perpendicular trunk, it sinks to and spreads over the bottom of the
vat, and raises the water to the top where it escapes by the small tube.

False bottoms are useful in this operation as they prevent the trunks or tubes,
from being stopped or clogged, and they receive the settlings.

What I claim as the invention of Henry Locker deceased, and not pre-
viously known is the trunks and tubes and the manner of using them.

Witnesses
Saml. Dale
Wm Locker

Henry C Locker.

600 [illegible]

Exd.
[illegible]

Process